United States Patent
Högström et al.

[11] Patent Number: 5,741,566
[45] Date of Patent: Apr. 21, 1998

[54] AUTOCLAVABLE MULTILAYER FILMS

[75] Inventors: Peter Högström, Stockholm; Stefan Lundmark, Drottningholm; Curt Lindhe, Söderbärke; Hannu Maasola, Villåhde, all of Sweden

[73] Assignee: Pharmacia & Upjohn Aktiebolag, Stockholm, Sweden

[21] Appl. No.: 507,256

[22] PCT Filed: Feb. 18, 1994

[86] PCT No.: PCT/SE94/00138

§ 371 Date: Nov. 20, 1995

§ 102(e) Date: Nov. 20, 1995

[87] PCT Pub. No.: WO94/19186

PCT Pub. Date: Sep. 1, 1994

[30]  Foreign Application Priority Data

Feb. 19, 1993  [SE]  Sweden ................... 9300558

[51] Int. Cl.$^6$ .................................. B32B 27/28
[52] U.S. Cl. ................ 428/35.2; 428/35.4; 428/36.7; 428/475.8; 428/476.1; 428/483; 428/515; 53/425; 53/449; 53/451
[58] Field of Search ................ 604/408; 428/35.2, 428/35.4, 36.7, 475.8, 476.1, 483, 316, 515; 53/425, 449, 451

[56]  References Cited

U.S. PATENT DOCUMENTS

| 4,407,897 | 10/1983 | Farrell et al. | 428/516 |
| 4,581,874 | 4/1986 | Rechsteiner et al. | 53/425 |
| 4,755,419 | 7/1988 | Shah | 428/476.1 |
| 5,004,647 | 4/1991 | Shah | 428/475.8 |
| 5,045,369 | 9/1991 | Kobayashi et al. | 428/36.7 |
| 5,053,281 | 10/1991 | Sakashita et al. | 428/412 |

FOREIGN PATENT DOCUMENTS

| 0 216 639 A2 | 6/1987 | European Pat. Off. |
| 0 236 099 A2 | 8/1987 | European Pat. Off. |

OTHER PUBLICATIONS

Farrell et al., Multilayer polymeric structures contain drying agent to maintain effectiveness of a moisture sensitive oxygen barrier layer, Abstract 003798772 of U.S. Patent No. 4,407,897.

Laminate with gas barrier properties useful for food packaging—comprises polyamide layer contg. structural units obtd. from M–xylene diamine, isophthalic acid and aliphatic dicarboxylic acid; Polyoledin Polyethylene Polyvinyl Alcohol, Abstract 008648439/7 of JP 3087254.

Primary Examiner—Charles Nold
Attorney, Agent, or Firm—Pollock, Vande Sande & Priddy

[57] ABSTRACT

An autoclavable multi-layer film formed of thermoplastic materials capable of being processed into hollow shapes and useful for packaging oxygen sensitive materials. The film includes sequential layers A—B—C—D—C—B'—A', wherein the film may optionally not include layer A or A' and the corresponding layer B or B'. A and A' are layers substantially water and water vapor resistant, wherein at least one of the layers A and A' is made of polyolefins, polyethylene terephthalates, or co-polymers of polyethylene terephthalates. B and B' are layers adhesively bonding layers A and A' with layers C. C is a layer of a moisture absorbing polymer substantially impermeable to oxygen. The polymer is selected from the group consisting of aromatic polyamides and co-polymers of aromatic polyamides. D is a layer of a polyethylene-vinyl alcohol with a molar ethylene concentration between 0% and 80%.

18 Claims, 4 Drawing Sheets

AUTOCLAVABLE MULTILAYER FILMS

FIELD OF INVENTION

The present invention relates to novel autoclavable multilayer films of polymeric materials, packages and flexible containers made thereof as well as a process for the production of such articles and the use of the films. The articles made from the novel multilayer films are especially suitable to contain oxygen sensitive medical or nutritional fluids for parenteral or enteral administration, because they retain both their transparency and oxygen barrier properties after autoclavation.

BACKGROUND OF THE INVENTION

It has been a considerable technical problem for manufacturers of materials for medical containers or packages to provide an autoclavable material compatible with infusion fluids often containing fat emulsions, to be administrated parenterally. It is especially desirable to retain flexibility and transparency of the material after the autoclavation while simultaneously meeting the demand of having an oxygen and water barrier for the protection of sensitive contents during storage.

Another problem to be solved is to find a polymer material which fulfills these criteria and still is environmental friendly and without any hazards for the manufacturers.

In many medical materials polymer materials such as those prepared from halogenated hydrocarbons like PVC or PVDC have traditionally been used, since they often have low permeability for water and gases and have advantageous mechanical properties. Medical plastic bags made from PVC are, however, undesirable because medical fluids may dissolve softeners from the PVC, making them incompatible with many requirements in pharmaceutical applications. Such migration effects can be especially problematic when storing fat emulsions which tend dissolve hydrophobic components from the polymers. PVC and other polymers from halogenated hydrocarbons are also unsuitable for other technical reasons, like their tendency to corrode and to wear the manufacturing equipment, and because of their environmental hazards. To overcome these drawbacks manufacturers have tried to assemble substitute packaging materials in the form layered structures, where the properties of each of the layers are intended to support the others to achieve air and water impermeability, suitable mechanical properties and a possibility to sterilize the package material and its contents by steam or by irradiation.

Steam-sterilizable multilayer materials are disclosed in numerous publications. A typical simple multilayer film fulfilling this technical requirement consists of three layers: polyolefin/polyamide/polyolefin. The polyolefin layer acts as a water barrier and the polyamide can be both moisture resistant and act as a substantial oxygen barrier. However, this type of film is not sufficiently effective as a moisture barrier. More efficient films are developed in the patent specifications EP 0216 639 and U.S. Pat. No. 4,407,897.

The European patent application EP 0457 648 discloses a more sophisticated type of film with different polymer barrier layers having complementary properties. In applications with extremely rigorous requirements, like storage of materials for parenteral administration in medicine, not even these films are satisfying in terms of oxygen barrier shaping qualities.

EP 0236 099 discloses a sterilizable seven layer film with oxygen barrier characteristics having the structure A/B/C/D/C/B/A, where A is an outer layer, B is an adhesive layer, C is an intermediate layer, and D is barrier core layer. The barrier core layer, D, is preferably made from ethylene vinyl alcohol polymer and is surrounded by two moisture absorbing nylon containing moisture absorbing layers C. The outer layers A, preferably consist of a copolymer of a polyolefin, such as a polyethylene with an unsaturated carboxylic acid or acid anhydride. The moisture absorbing nylon layers, C, will however, include nylon 6, which makes the film unsuitable for medical applications due to the risk of an eventual caprolactam release which is regarded as a hazardous contribution to parenterally administerable fluids. Nylon containing films also have a tendency to become opaque after heat sterilization which can give the resulting product an undesired appearance. Besides these drawbacks, the films of EP 0236 099 seem to be excessively stiff for convenient handling and manufacturing. Additionally, articles made from the film will not be easy to open because that there will not be any peel effect between the outer layers A.

The abstract of the Japanese patent application 3087254 reveals a laminate with good oxygen barrier properties composed a copolymer polyamide layer containing structural units from meta-xylene polyamide, a polyolefin layer and/or an EVOH layer. This film will, however suffer from the disadvantage of becoming opaque after autoclavation and it will also lack the peel effect between its outer layers.

Consequently, there is still a great demand for improved steam sterilizable multilayer materials with very low oxygen permeability for packaging perishable medical and/or nutritional fluids for parenteral administration in a single primary package with excellent transparency.

SUMMARY OF THE INVENTION

The invention intends to provide a multilayer film, which is substantially impermeable to oxygen and autoclavable, while having flexible properties suitable for further processing and manufacturing to packages, containers and other shapes to be filled with oxygen sensitive and perishable goods, as well as having the benefit of a high aesthetical value, due to its retention of transparency after autoclavation.

The invention is also directed to flexible containers or medical packages containing medical or nutritional material made from the novel multilayer film, as well as processes for their manufacture and the use of the novel film for the manufacture of such articles.

A further object of the invention is a process for the preparation of the multilayer film by sequentially laminating together the different layers.

The multilayer film is most readily described by the general sequential palindrome formula A—B—C—D—C—B'—A', wherein each capital letter symbol corresponds to a unique layer of the film.

The layers are all made of polymeric materials with characteristic chemical and physical properties and are generally described as follows part. The outermost layers A and A' front the environment and the perishable goods inside a container made from the multilayer film. In certain applications, when the multilayer film is used as a wrapping for another container, either A or A' faces a bag or a primary container filled with the perishable goods. The multilayer film will, in such cases be formed as an envelope or a secondary container filled with an inert atmosphere and a primary container before sealing.

A and A' shall be made from a moisture resistant material capable of withstanding both water vapor and liquid water.

These layers can be made from the same or different polyolefines or PET (polyethylene-terephtalate) or copolymers of PET. Preferred polyolefines are polyethenes and polypropylenes with moisture barrier qualities. It is especially preferred to select polyolefines which form a weak seal welding with each other so that peelable contact surfaces will be formed when autoclaving the film. In such cases the layers A and A' shall be made from polymers compatible with each other, so molecules in their contact surfaces can interdiffuse under the influence of heat.

The one of layers A or A' which faces the environment can be removed in a special embodiment of the invention, to further increase the flexibility of the multilayer film, and to provide a surface suitable for welding. In this case the subsequent adhesive layer B will also be removed.

The layers B and B' are adhesive layers or tie-layers providing adhesive bonding between layers A and A' and layers C. The nature of such a layer can be easily determined and chosen by anyone aware of the polarity of layers A and A' and C. For example, B must be a significantly hydrophilic polymer if the other fronting layers are hydrophobic.

The layers C are made from polymers with moisture absorbing qualities and are substantially impermeable for oxygen, thus providing a barrier for oxygen. Especially suitable polymers are found among aromatic polyamides or derivatives or copolymers thereof which can absorb moisture and increase their density and thereby substantially contribute to the oxygen barrier. It also an important requirement that the polyamides are totally biocompatible and not release caprolactams and other potentially hazardous compounds to the stored materials.

The layer D consists of poly(ethylene)-vinyl alcohol (EVOH), which is a material with excellent oxygen barrier qualities as long as it is dry. The EVOH-layer has hydrogen bondings between its hydroxide molecules which will be destroyed by penetrating water molecules, so that oxygen can leak through the layer and its barrier function decays rapidly.

The multilayer film assembled with layers according to above, will provide a surprisingly effective oxygen and moisture barrier both during autoclavation at about 120° C. and during storage for the protection of perishable material such as parenteral infusion fluids.

The inventive multilayer film is constructed especially to prevent the EVOH from losing its effect as an oxygen barrier. EVOH, will as previously explained, be an excellent barrier for oxygen in a dry condition.

In previous applications of EVOH, such a film is bonded to a moisture protecting layer of, for example, polyolefines. The protecting polyolefin layers are sufficient for use under normal conditions, but autoclaving leads to an increase in oxygen penetration which will cause a permanently decreased oxygen barrier quality of the EVOH. Besides that, the autoclaving conditions will lead to a whitening effect which deteriorates the transparency of the film.

According to the present invention the EVOH-layer therefore is surrounded with two layers of a polyamide including aromatic groups (or a derivative or a copolymer thereof) acting as a moisture absorbent which will absorb water corresponding to the dynamically cycle of the sterilization in an autoclave. Together with the water resistant layers A and/or A' and the adhesive layers B and/or B', the multilayer film is an optimally assembled film, balancing the kinetics of the steam sterilization. It means that the EVOH-layer will be protected from water, because water will never have the opportunity to pass the protective layers A and/or A' and C.

The layers C, consisting of an aromatic polyamide (or a derivative or copolymer thereof), both contribute to the oxygen barrier and to the moisture barrier, because of its moisture absorbing quality.

An advantage with the multilayer film according to the present invention with the specifically selected layers C is that pure EVOH can be used without any compatibilisers, such as nylon, which lead to decreased risks for migration effects during the storage of fluids.

Another advantage compared to conventional films made from polypropylene/EVOH/polypropylene is that the drying step becomes superfluous. The novel films will immediately provide an excellent oxygen barrier after autoclavation and not be subjected to irreversible barrier losses.

The layers A and/or A' are essentially moisture barriers, preventing water to reach the EVOH-layer through the polyamide layers, preferably chosen to form weak seal weldings when heated to form peelable surfaces.

The inventive multilayer film material can be assembled with conventional processing methods as coextrusion or laminating. The conditions for manufacturing processess of the film will vary with the materials used as layer components, but can easily be found out by persons smiled in the art. The multilayer film material according to the invention is also easy to process into hollow shapes as sealable, flexible or collapsible containers packages, bags or pouches etc. by conventional means and methods.

Medical packages manufactured from the film will preferably contain sterilizable, but perishable goods, in the form of fluids or solid material to be mixed with such fluids. The goods stored in such packages are intended to be administered parenterally or enterally for therapeutical and/or nutritional purposes.

Examples of such fluids or materials are lipid emulsions, amino acids, glucose and other carbohydrates, vitamins, electrolytes, trace elements or any mixture thereof. These components may be stored together or stored separately in a multi-compartment package prepared from the inventive multilayer film. The medical packages according to the invention can be aseptically filled with the fluids or materials mentioned above and will thereafter be sealed by conventional sealing means, for example, by welding, and finally subjected to heat sterilization in an autoclave.

In other applications, for example when especially heat sensitive and perishable goods shall be stored, it can be suitable to fill the perishable goods aseptically in a primary, inner container principally made of one or plural layers of an at least partially oxygen permeable polymer like EVA poly (ethylene)-vinyl acetate), which is sealed and sterilized by irradiation. In other applications can of course the primary, inner container be sterilized by other means such as steam. The primary container is thereafter placed in an envelope formed by the multilayer film according to the invention, air is evacuated by vacuum generating means and atmospheric pressure restored by an inert gas before sealing the envelope. All types of containers, bags or envelopes disclosed herein can be manufactured as both one-, two- three- or multi-compartment containers provided with means for communication between the compartments, so their components can be mixed immediately before dispensing the contents of the containers.

DETAILED DESCRIPTION OF THE INVENTION AND PREFERRED EMBODIMENTS

Figure 1:
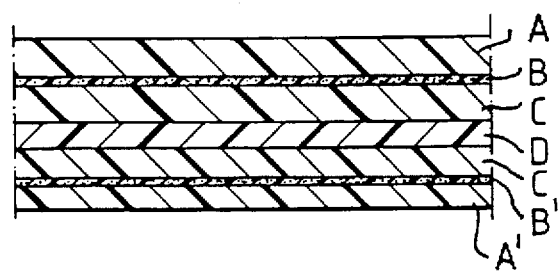
FIG. 1 illustrates a schematic cross sectional view of an embodiment of the film according to the invention. The capital letter symbol in the figure corresponds to the symbols and layers used elsewhere in the text.

Multilayer films according to the invention described with the general schematic formula A—B—C—D—C—B'—A' will preferably be composed by individual layers as desribed below.

The outer water and water vapor resistant layers A and A', of which one optionally could be removed, can be made of polyolefines, polyethyleneterephtalates (PET) or copolymers of PET. Suitable polyolefines are polyethenes and polypropylenes. The polyolefines should be both moisture resistant and resistant for sterilization by irradiation, examples of such a materials are the polypropylene WB8052C from Neste and various polyethenes. Polypropylene is especially preferred if the multilayer film shall be subjected to steam sterilization, but if sterilization by irradiation is for some reason desirable, polyethenes are the suitable choice for layers A and A', since polypropylenes are not sterilizable with irradiation. It is also possible to use copolymers of polypropylenes and polyethenes in these layers. It is especially preferable to choose such polypropylenes having qualities that are capable of forming weak weldings between such layers A and/or A', when heating the material, for example, during autoclavation. The effect will be a ready peelable surface between such layers A and/or A'. Persons skilled in the technique will not have any difficulties to find suitable materials for the outer layers according to the guidelines presented above. The thickness of outer layers A and A' are preferably 20–100 μm and most preferably 45–55 μm.

The adhesive layers or "tie-layers" B will be chosen from materials providing adhesive bonding with both layers A/A' and layers C. As previously mentioned above, layers B and B' are chosen with respect to the polarity of the surrounding layers, which shall be bonded together. Examples of material suitable for binding polyethenes and polyamides together are Dow Prima Cor 16105 and Admer® QF500E, which are polypropylene modified maleic acid anhydrides. The layers B and B' shall be about 10 μm in thickness. Alternatively, layers B and B' have a thickness of between 2 to 30 μm each and preferably between 5 and 25 μm. If layers A/A' consist of polypropylene is Admer® QF55IE a suitable choice as a binding layer.

The layers C consist of moisture absorbent and oxygen barrier shaping aromatic polyamides or derivatives or copolymers thereof and have a preferred thickness of 20–100 μm, most preferably between 30–40 μm. One example of a material appropriate according to the invention is made from a composition of 80% Nyref® MXD-6 from Mitsubishi with a melting point of 245° C. consisting of a copolymer of metaxylenediamine and adipidic acid and 20% of XE 3303 from EMS-Chemie, which is a copolymer of hexamethyleneadinine and adipidic acid or a copolymer of adipidic acid, hexamethyleneadinine and sepaic acid. Copolymers of the mentioned MXD6 and XE 3303 are also conceivable according to the invention. An example of another suitable composition consists of the mentioned MXD6 of grade 6007 and Polyamide 66 (PA66), (a copolymer of hexamethyleneadinine and adipidic acid), with less than 1.3 in relative viscosity. It is also suitable that the polymers of layers C include an aromatic acid having two acid groups combined with an aromatic amine having two amino groups.

The principal oxygen barrier layer D of the multilayer is made of polyethylene vinyl/alcohol (EVOH) with a thickness of 2–40 μm, preferably about 20 μm. The molar ethylene concentration in the EVOH can vary from 0–80% (0% means PVOH, polyvinyl alcohol), preferably between 10–50%. An appropriate quality for this layer is BX220 from Dupont with a molar ethene concentration of 33%.

A preferred embodiment of the multilayer film is polyethen (A)/adhesive layer made of Dow Prima Cor 16105 (B)/layer made of 80% MDX-6 and 20% of XE 3303 (C)/layer of the EVOH BX 220 (D)/same as previous (C)/same as previous (B)/same as previous (A). For the exact definitions of the components of the layers reference is made to the text above.

The examples of the components of the layers are not intended to be limiting. Any person skilled in the art of polymer materials can easily find appropriate and well functioning alternatives to the components exemplified in this text within the scope of invention as it is defined by the claims.

The following studies intend to compare the oxygen permeability, the water permeability and the material weight before and after autoclaving between the inventive multilayer film and other film materials.

The seven tested film materials are:

Film 1: polypropylene (PP)/EVOH; 30% ethene/polypropylene (PP)

Film 2: PP/EVOH; 44% ethene/PP

Film 3: PP/polyamide: XE 3303 (PA)/PP

Film 4: Polyethen (PE)/PA (as in Film 3)/PE

Film 5: PE/polyamide: 80% MXD6 and 20% XE 3303 (PA)/EVOH; 33% ethene/PA (same)/PE Film 6: PP/PA (polyamide 6)/a copolymer containing EVOH/PP Film 7: Polytehyleneterephtalate (PET)/glass/PET/PP The adhesive or "tie-layers" between layers of the exemplified films have not been included in the schematic comparison above. For information about the polyamide materials in Films 3–5, see the detailed description above. Film 5 is an example of a multilayer material according to the present invention.

Films 1–5 have been manufactured by Wihuri Oy Wipak Medical and Films 6–7 are supplied by Soplaril S.A.

Film 6 is an example of a material disclosed in the European Patent Application EP 0457 648.

Table 1 shows the oxygen permeability measured in cubic centimeters per square meter, day and bar for Films 1–7 at different temperatures and different relative humidity.

TABLE 1

| | Permeability (before sterilization) | |
|---|---|---|
| | Ox. 23° C./60% RH cc/m²,day,bar | Ox. 50° C./>95% RH cc/m²,day,bar |
| Film 1 | <0.5 | 8.50 |
| Film 2 | 5.00 | |
| Film 3 | 38.00 | 195.00 |
| Film 4 | 37.00 | 175.00 |
| Film 5 | 0.50 | 4.50 |

TABLE 1-continued

| | Permeability (before sterilization) | |
|---|---|---|
| | Ox. 23° C./60% RH cc/m², day, bar | Ox. 50° C./>95% RH cc/m², day, bar |
| Film 6 | | 6.00 |
| Film 7 | 0.84 | 5.00 |

The results from Table 1 indicate that Film 5, prepared according to the present invention, has the best oxygen barrier properties of the compared multilayered films.

Figure 2:
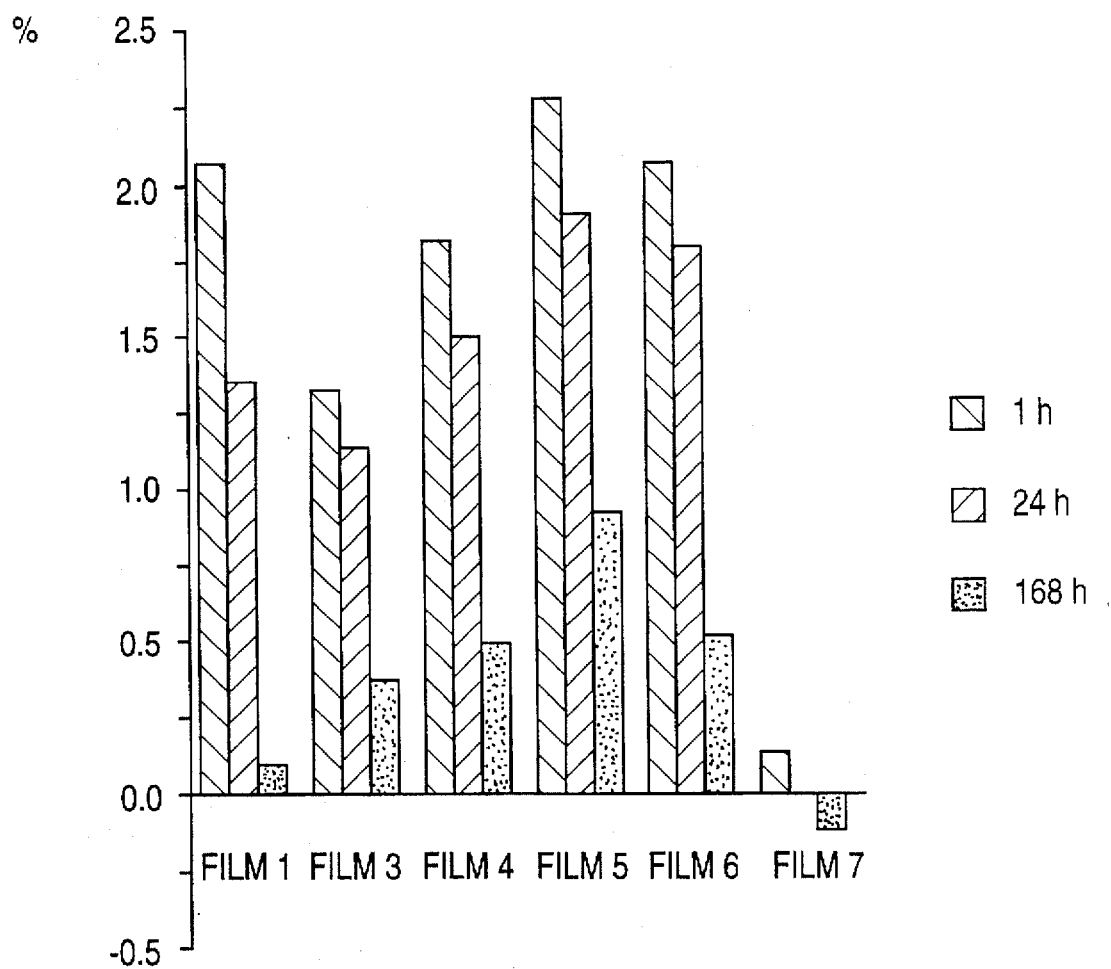
FIG. 2 shows a comparison of weight changes of different multilayered films and a film according to the invention.

FIG. 2 presents weight changes before and after autoclavation of pouches made from Films 1 and 3–7. The pouches were weighed before and after autoclavation, wrapped around an inner bag and once again autoclave. The inner bag was removed and the pouch wiped dry. The pouches were weighed again after 1 hour, 24 hours and one week, respectively.

The results from this test show that Film 5 according to the present invention absorbs more moisture and retains it much longer (has lower weight reduction) than the other films. This can be explained by the double polyamide layers of Film 5 absorbing more water and holding it longer. It is however, surprising that this film has such a low oxygen permeability. This phenomenon can be explained by that the PA-layers absorb so much moisture during the autoclavation that it never reaches the EVOH in the interior of the film.

Figure 3:
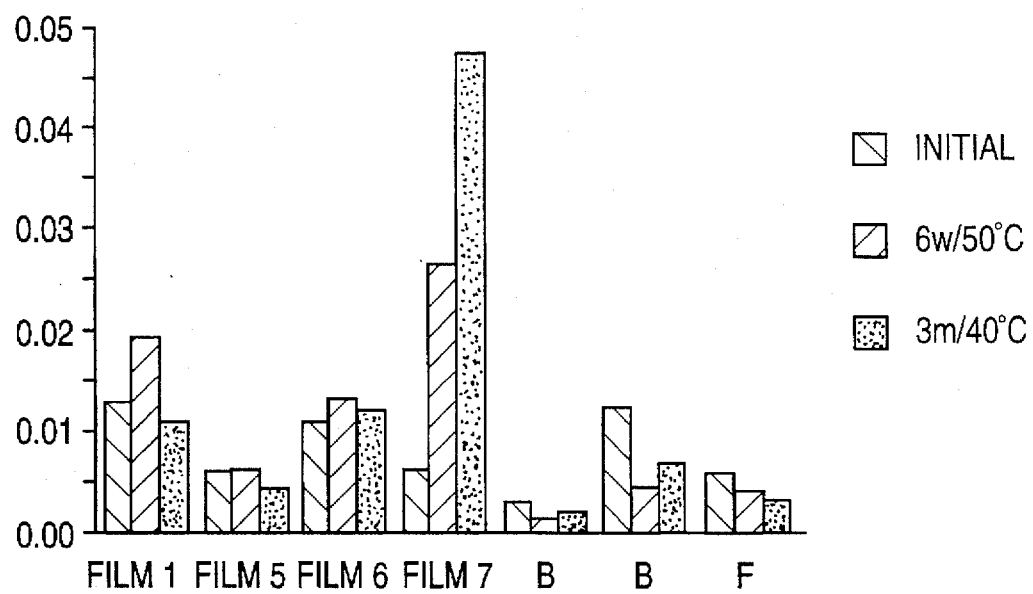
FIGS. 3 and 4 show the change in absorbance for products stored in different multilayered films compared to a film according to the invention.
Figure 4:
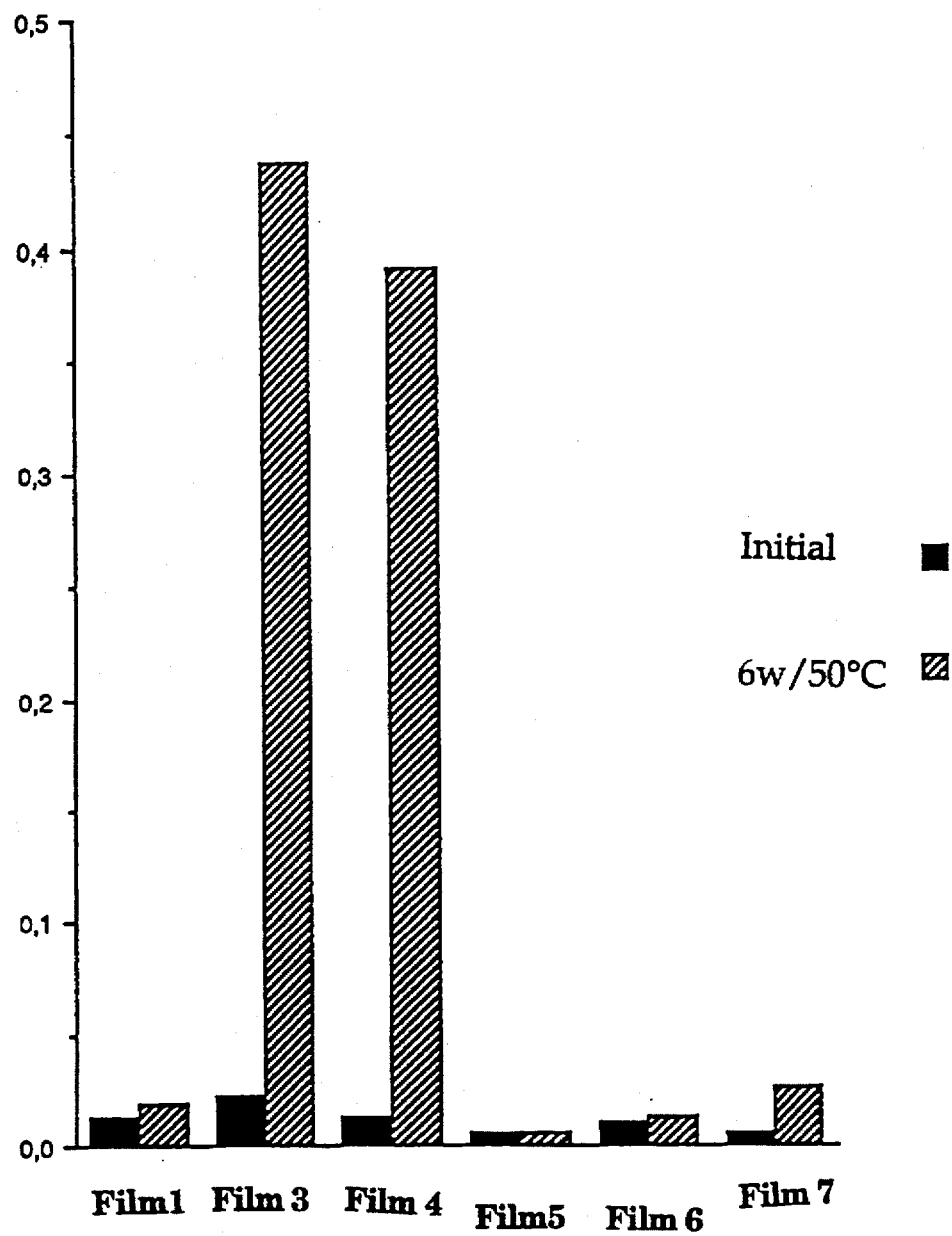

FIGS. 3 and 4 show the absorbance measured at 430 nm after six weeks and three months storage of Vamin 18® (an amino acid mixture useful in parenteral nutrition) in containers manufactured from Films 1 and 3–7 and in comparison to traditional storage materials as glass bottles and aluminum foil. The absorbance value will be a measure of the oxygen penetration of the film. The increase in absorbance is derived from oxygen dependent dimerization of certain amino acids in Vamin 18®.

As shown in FIGS. 3 and 4, Film 5 according to the invention has superior properties regarding oxygen penetration compared to the other film materials and comparable to the traditional materials.

The advantageous results of the film according the invention must be credited to the surprisingly successful efforts to combine the properties of the different layers. Especially in terms of providing an efficient moisture barrier with moisture absorbent properties surrounding the principal oxygen barrier layer D of EVOH. The inventive multilayer film can be seen as effort to provide art ideal environment for layer D, so its oxygen barrier properties are constant even during and after autoclavation.

We claim:

1. An autoclavable multi-layer film formed of thermoplastic materials capable of being processed into hollow shapes and useful for packaging oxygen sensitive materials, comprising:

sequential layers A—B—C—D—C—B'—A', wherein the film may optionally not include layer A or A' and the corresponding layer B or B', and wherein:

A and A' are layers substantially water and water vapor resistant, wherein at least one of the layers A and A' is made of polyolefins, polyethylene terephthalates, or co-polymers of polyethylene terephthalates;

B and B' are layers adhesively bonding layers A and A' with layers C;

C is a layer of a moisture absorbing polymer substantially impermeable to oxygen, said polymer being selected from the group consisting of aromatic polyamides and co-polymers of aromatic polyamides; and D is a layer of a polyethylene-vinyl alcohol with a molar ethylene concentration between 0% and 80%.

2. A film according to claim 1, wherein layer C includes at least one aromatic polyamide which is a co-polymer of hexamethyleneadinine or metaxylenediamine.

3. A film according to claim 1, wherein layer C includes at least one aromatic polyamide that was polymerized from an aromatic acid having two acid groups and an aromatic amide having two amino groups.

4. A film according to claim 1, wherein at least one of the layers A and A' is made of polyethylene, polypropylene, or copolymers thereof.

5. A film according to claim 1, wherein the polyethylenevinyl alcohol with a molar ethylene concentration between 10% and 50%.

6. A film according to claim 1, wherein layers A and A' each have a thickness of between 20 and 100 μm, layers B and B' each have a thickness of between 2 and 30 μm, layers C each have a thickness of between 20 and 100 μm, and layer D has a thickness of between 2 and 40 μm.

7. A film according to claim 1, wherein layers A and A' each have a thickness of between 45 and 55 μm, layers B and B' each have a thickness of between 5 and 25 μm, layers C each have a thickness of between 30 and 40 μm, and layer D has a thickness of between 15 and 25 μm.

8. A film according to claim 1, wherein said film is transparent and a barrier to oxygen after autoclavation.

9. A flexible container manufactured from a multilayered film according to claim 1.

10. A flexible container according to claim 9, wherein said container contains sterilizable medical or nutritional fluids.

11. A flexible outer package for at least one of medical and nutritional uses manufactured from a multilayered film according to claim 1 and contains parenterally administered fluids.

12. A flexible outer package for at least one of medical and nutritional uses manufactured from a multilayered film according to claim 1 and contains parenterally administered fluids in a primary inner package.

13. A process for manufacturing a medical package according to claim 11, wherein said package is aseptically filled with said fluids, sealed with sealing means, and subjected to steam sterilization.

14. A film according to claim 2, wherein layer C contains at least one aromatic polyamide that was polymerized from an aromatic acid having two acid groups and an aromatic amide having two amino groups.

15. A film according to claim 2, wherein at least one of layers A and A' is made of polyethylene, polypropylene or copolymers thereof.

16. A film according to claim 3, wherein at least one of layers A and A' is made of polyethylene, polypropylene or copolymers thereof.

17. A film according to claim 2, wherein the molar ethylene concentration of the polyethylene-vinyl alcohol in layer D is between 20 to 50%.

18. A film according to claim 3, wherein the molar ethylene concentration of the polyethylene-vinyl alcohol in layer D is between 20 to 50%.

* * * * *